3,561,294
HYDRAULIC CONTROL SYSTEM FOR AUTOMATIC TRANSMISSION
Tetsuya Iijima, Tokyo, Japan, assignor to Nissan Jidosha Kabushiki Kaisha, Yokohama, Japan
Filed Nov. 29, 1968, Ser. No. 779,917
Claims priority, application Japan, Dec. 19, 1967, 42/80,979
Int. Cl. B60k 21/10
U.S. Cl. 74—869      2 Claims

ABSTRACT OF THE DISCLOSURE

In a hydraulic control system for an automatic transmission of a vehicle, to control line pressure actuating friction clutches and brakes, two valves are provided to decrease line pressure stepwise at starting conditions all through the selected positions and to increase line pressure stepwise at low throttle high speed conditions only when a low gear ratio causing an engine braking condition is selected.

CROSS REFERENCE OF THE INVENTION

The present invention relates to improvements to inventor's application Ser. No. 779,927 concerning a hydraulic control system for automatic transmissions, filed the same day.

The present invention relates generally to a control system for a multiple speed ratio power transmission mechanism, and more particularly to a hydraulic control system for an automatic transmission of a vehicle.

Automatic transmission mechanisms having planetary gear units usually include a plurality of friction elements, such as friction clutches and friction brakes, to provide a plurality of gear ratios by selectively engaging or releasing the friction elements. To attain smooth shifts between gear ratios, hydraulic control systems are provided to detect engine output torque and vehicle speed and to change the capacity of the friction elements by regulating the actuating hydraulic pressure in relation to the detected values.

The torque of the friction element, i.e. transmission torque of the friction clutch and braking torque of the friction brake, must be changed in accordance with engine loads and vehicle speeds. The necessary torque capacity increases as the engine load increases, and must be relatively large at starting or low speed and relatively small at higher speed. In the specification and claims, "friction clutch" means engageable and disengageable means to connect or disconnect torque transmission between rotatable members, "friction brake" means engageable and disengageable means to clamp or release a rotatable member to a stationary portion of the transmission mechanism, and "friction element" includes such friction clutches and/or friction brakes.

When the torque capacity of such friction element is too small compared to required torque capacity at the time, a slipping between the members to be clamped to each other will be too much and result in inaccurate operation or overspeed of the engine. When the torque capacity of the friction element is too large, the clutch or brake will engage instantaneously and result in severe shock. As the torque capacity depends on hydraulic pressure which actuates a hydraulic piston operating the friction element, by controlling the hydraulic pressure so as to minimize the difference between the torque capacity of the friction element and the necessary torque to be transmitted or braked, smooth shift operation can be attained without too much slipping and without any uncomfortable shock.

In known hydraulic control systems, when the operator manually selects forward or rearward drive position from neutral position an uncomfortable shock occurs because of too high a hydraulic pressure is applied to actuate the friction elements compared to required torque capacity. Also, when a low speed gear ratio is manually selected to obtain an engine braking effect while running at high speed gear ratio, the engaging brake slips too much resulting in an ineffective engine braking effect because of too low a hydraulic pressure being applied to actuate the friction element, as the hydraulic pressure is generally low at a high speed, low throttle operating condition.

It is a primary object of the present invention to provide a hydraulic control system having means to control hydraulic pressure for actuating friction elements to attain smooth shifting of automatic transmission to eliminate or at least mitigate the above mentioned disadvantages.

Generally stated, according to the present invention, directed to a hydraulic control system, two simple valve means are added to automatically control valve spools of the hydraulic control system by controlling the fluid pressure. Thus, hydraulic pressure to actuate friction elements is decreased to accommodate the necessary torque capacity when forward or reverse position is selected from neutral position, and further, hydraulic pressure is increased to accommodate the necessary torque capacity when a low gear ratio position is selected to attain an engine braking function at high speed low throttle operating conditions.

Further and more specific objects, features and advantages of the present invention and the manner in which the invention is carried into practice are made apparent in the following detailed description of preferred embodiments, by way of example, wherein reference is made to the accompanying drawings, in which:

FIG. 1 shows a diagrammatic illustration of a power transmission mechanism of an automatic transmission of a vehicle, FIG. 2 shows a diagram of the one embodiment of hydraulic control system according to the present invention, controlling the transmission shown in FIG. 1, FIG. 3 is a chart showing the fluid pressure characteristic of the coasting booster valve shown in FIG. 2, FIG. 4 is a characteristic diagram of hydraulic pressure at position D and 1st speed ratio of position "1,"

Figure 1:
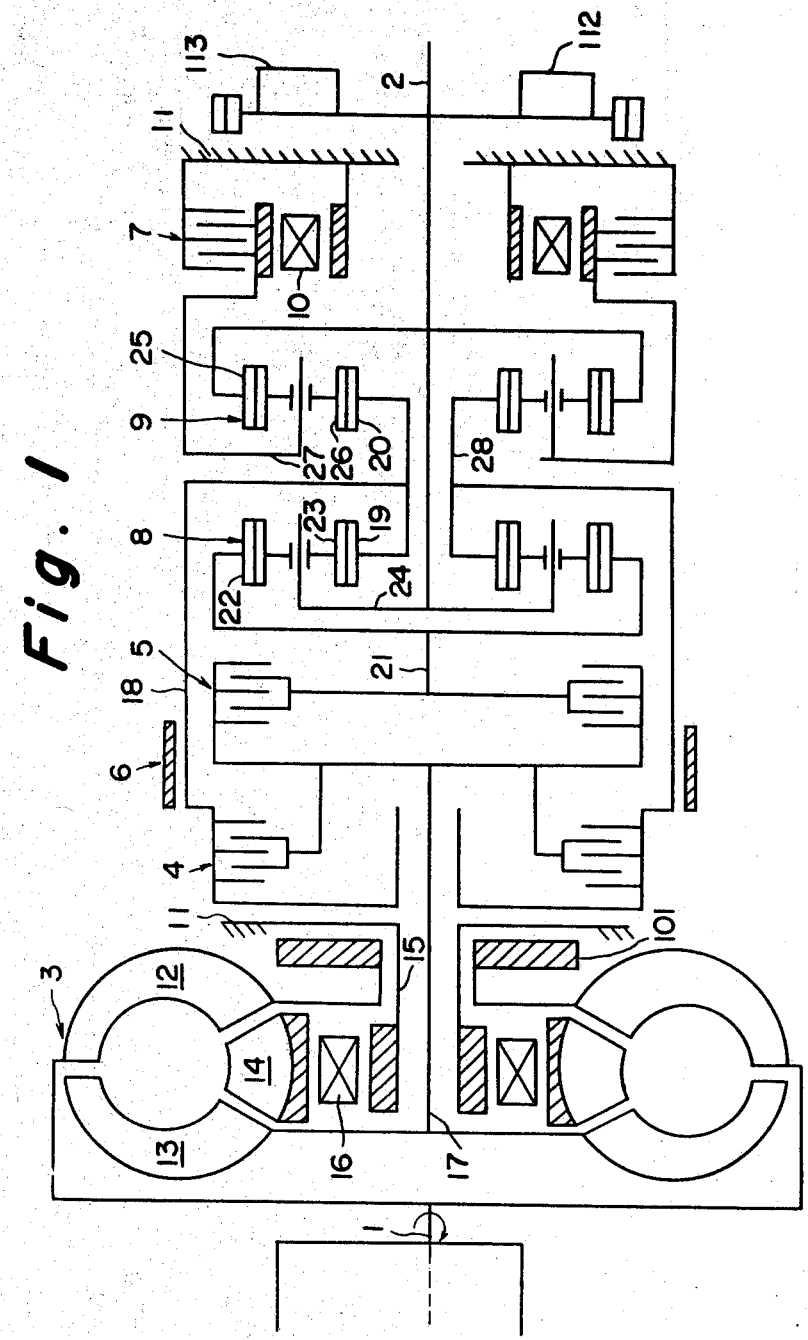

FIG. 1 shows in a schematic form a typical power transmission mechanism providing a three element torque converter unit and two planetary gear units. While this is used as an example to describe the invention, it will be understood that the present invention has application to any apparatus comprising a torque converter or a hydraulic coupling unit and a plurality of planetary gear units and providing a hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one-way brake 10 and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one-way clutch 16, and is filled with working fluid transmitting the driving torque. The power transmitted by the engine drive shaft 1 through the impeller 12 and the working fluid to the turbine 13 is transmitted through an intermediate shaft 17 which is connected to the turbine 13 to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is also secured to a ring gear 25 of the rear planetary gear unit 9. A plurality of planet gears 26 meshing with the ring gear 25 and the sun gear 20 are supported by a carrier 27 which is connected to the friction brake 7 and the one-way brake 10. The friction brake 7 clamps by engagement thereof the planet gear carrier 27 and the one-way brake 10 permits rotation of the carrier 27 only in the direction of the input shaft 1 indicated by an arrow. The friction brake 6 clamps by tightening to the drum 18 the sun gear 19 and 20 through a hollow transmission shaft 28.

The transmission mechanism shown in FIG. 1 provides three forward and one reverse speed ratios by suitable engagement of the friction elements as shown in Table 1.

TABLE 1

| | Gear ratio | Friction elements engaged | | | | |
|---|---|---|---|---|---|---|
| | | Clutch 4 | Clutch 5 | Brake 6 | Brake 7 | One-way brake 10 |
| Speeds: | | | | | | |
| 1st | 2.45 | — | o | — | — | o |
| 2d | 1.45 | — | o | o | — | — |
| 3d | 1.00 | o | o | — | — | — |
| 1st manual low | 2.45 | — | o | — | o | o |
| Reverse | 2.18 | o | — | — | o | — |

In Table 1: "o" shows engagement of the friction element or blocking on the one-way brake; and "—" shows disengagement or free relative rotations thereof.

In FIG. 1, no hydraulic control system for actuating the friction elements is shown, however, a few of the functional members are shown. These are an engine driven fluid pump 101 and a governor valve assembly 112 and 113 which is connected to the output shaft 2.

Figure 2:
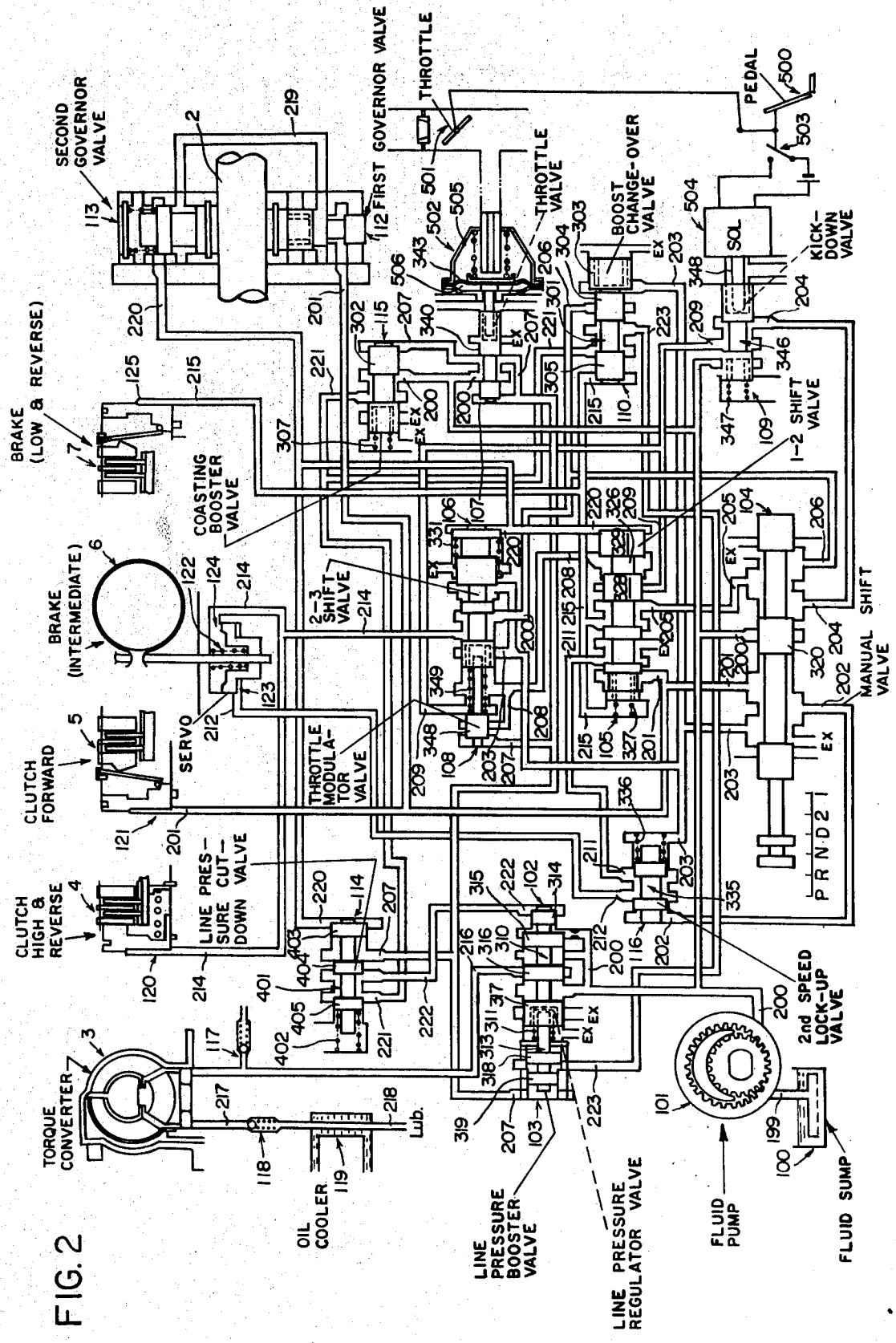

FIG. 2 shows a hydraulic circuit diagram of a hydraulic control system which is adapted to control the power transmission mechanism shown in FIG. 1, according to one preferred embodiment of the present invention. The hydraulic control system comprises a fluid sump 100, the fluid pump 101, a line pressure regulator valve 102, a line pressure booster valve 103, a manual shift valve 104, a 1-2 shift valve 105, 2-3 shift valve 106, a throttle valve 107, a throttle modulator valve 108, a kick-down valve 109, a boost change-over valve 110, a first governor valve 112, a second governor valve 113, a line pressure cut down valve 114, a coasting booster valve 115, a 2nd speed lock up valve 116, a torque converter relief valve 117, and a torque converter check valve 118 to effect desired automatic shifting between the above mentioned speed ratios by introducing predetermined line pressure to the friction elements. The control system further includes a torque converter oil cooler 119, a hydraulic servo 120 to engage the friction clutch 4 by introducing hydraulic pressure to the servo 120, a hydraulic servo 121 to operate the friction clutch 5, a hydraulic servo 122 to operate the friction brake 6, an engage side brake chamber 123 and a release side brake chamber 124 of the hydraulic servo 122, a hydraulic servo 125 to operate the friction brake 7, and also as control components, an accelerator pedal 500, a carburetter throttle valve 501, a vacuum diaphragm unit 502, a kick-down switch 503 to actuate the throttle valve 107 and a kick-down solenoid 504, and further, actuating and controlling lines and passages properly connecting the valve and components to provide desired hydraulic control of the automatic transmission.

As a single hydraulic pressure source, operating fluid of the hydraulic control system, working fluid of the torque converter 3 and lubricant fluid of the transmission mechanism are delivered by the positive displacement fluid pump 101 which is driven by the engine as shown in FIG. 1 and is adapted to draw fluid from the sump 100 through suction line 199 and to supply fluid under pressure to the above mentioned components through passage 200. The fluid pressure in the passage 200 is the main source of the hydraulic circuit and is mentioned as line pressure.

The line presure through passage 200 is regulated by the line pressure regulator valve assembly 102 and 103 as will be described more fully hereinafter. Fluid under pressure which is supplied to the torque converter 3 from the passage 200 through the pressure regulator valve 102 and passage 216 is regulated by the torque converter relief valve 117 which prevents fluid pressure from increasing beyond a predetermined value. Fluid pressure in the torque converter 3 is maintained by the torque converter check valve 118, and the fluid passed through the check valve 118 is delivered through an oil cooler 119 to portions to be lubricated.

The manual shift valve 104 comprises a valve spool 320 which is operated by the vehicle operator to introduce line pressure in the passage 200 to passages 201 through 206 as shown in Table 2, according to the selected positions of the shift lever not shown.

TABLE 2

| | Selected position | | | | | |
|---|---|---|---|---|---|---|
| | P | R | N | D | 2 | 1 |
| Passage: | | | | | | |
| 201 | — | — | — | o | o | o |
| 202 | — | — | — | o | o | — |
| 203 | — | — | — | o | — | — |
| 204 | o | o | — | — | o | o |
| 205 | o | o | — | — | — | o |
| 206 | — | o | — | — | — | — |

In the Table 2: "o" shows communication of the passage to line pressure at the selected position; and "—" shows communication to exhaust port at the selected position. The operation of the power transmission mechanism shown in FIG. 1 according to the selected positions P, R, N, D, "2" and "1" will be as follows:

P: The output shaft 2 is locked by a locking device not shown,

R: reverse drive,

N: neutral, power is not transmitted to output shaft 2,

D: forward drive, the transmission shown is shifted automatically between 1st, 2nd and 3rd speed ratios, "2": lock to 2nd speed ratio, "1": down shift from 2nd to 1st speed ratio and maintaining 1st speed ratio.

The manual shift valve spool 320 is shown in the neutral or N position in FIG. 2, thus blocking all operating passages from line pressure and communicating them to exhaust ports Ex which communicate to the sump 100 through passages not shown.

When the operator shifts the manual shift valve 104 to the automatic three speeds forward position D, passages 201, 202 and 203 communicate to the line pressure passage 200. The line pressure supplied through passage 201 actuates the hydraulic servo 121 to engage the friction clutch 5 all through the three speeds forward drive. Further, passage 201 communicates to the 1-2 shift valve 105 and the first governor valve 112. The line pressure through the passage 203 is supplied to the 2-3 shift valve 106.

The 1-2 shift valve 105 comprises a valve spool 326 which is biased by a spring 327 to keep the valve spool 326 to the rightward position as shown in FIG. 2 at 1st speed ratio and blocks the passage 201 from communication anywhere. Thus only the friction clutch 5 is engaged, and the vehicle drives forward at 1st speed ratio as shown in Table 1 due to the engagement of the one-way brake 10. In this case, because the one-way brake 10 is utilized, the engine drives the wheels, but the wheels cannot drive the engine, so that an engine braking function cannot be obtained, due to free rotation of the one-way brake 10. As the vehicle speed increases governor pressure produced by the governor valve assembly 112 and 113, as will be explained more in detail hereinafter, through passage 220 urges the valve spool leftward, so that the passage 201 communicates to passage 211 to apply pressure to the engage side chamber 123 of the hydraulic servo 122 of the friction brake 6, thus the friction brake 6 is engaged to attain 2nd speed ratio of the power transmission mechanism as shown in Table 1.

The 2-3 shift valve 106 comprises a valve spool 330 which is biased to the righthand position as shown in FIG. 2 by a spring 331 at 1st and 2nd speed ratios. As the vehicle speed further increases, governor pressure through passage 220 is increased sufficiently to urge the valve spool 330 leftward to communicate passage 203 to passage 214 through a groove of the valve spool 330. Line pressure through passage 214 is supplied to the hydraulic servo 120 to engage the friction clutch 4 and also to the release side chamber 124 of the hydraulic servo 122 to release the friction brake 6. By providing an area difference between the chambers 124 and 123, the friction brake is released when both chambers 124 and 123 are supplied by line pressure, so that a smooth shift process between the 2nd and 3rd speed ratios is attained. Thus as shown in Table 1 the power transmission mechanism shown in FIG. 1 is driven in the 3rd speed ratio or direct coupling.

When the operator selects the position "2" by shifting the manual shift valve 104, line pressure through passage 200 is supplied to passages 201, 202 and 204. Line pressure through passage 201, as in selected position D, engages the friction clutch 5.

The 2nd speed lock-up valve 116 comprises a valve spool 335 which is biased to the leftward position as shown in FIG. 2 by a spring 336 when passages 202 and 203 are both communicated to the exhaust port, so that passages 211 and 212 are connected together. Thus, when passage 211 is communicated to line pressure at the second speed ratio in position "D" or "1," the pressure is supplied through passage 212 to the engage side chamber 123 of the hydraulic servo 122 to engage the friction brake 6. When the position "2" is selected, passage 202 communicates to line pressure and passage 203 communicates to the exhaust port, thus the valve spool 335 is urged rightward to communicate passage 202 to passage 212 so that line pressure is supplied to the engage side chamber 123 of the hydraulic servo 122 to engage the friction brake 6. Thus 2nd speed ratio is attained. The valve spool 335 maintains the rightward position throughout the selected position "2" and is not affected by vehicle operating conditions such as speed or throttle opening.

When the operator selects the position "1" by shifting the manual shift valve 104, line pressure through passage 200 is communicated to passages 201, 204 and 205. As before, line pressure through passage 201 acts to engage the friction clutch 5 all through the position "1." Line pressure through passage 205 communicates to passage 215 when the 1-2 shift valve 105 is rightward position as shown in FIG. 2, so that the line pressure actuates the hydraulic servo 125 to engage the friction brake 7, thus 1st speed ratio is obtained. If the 1-2 shift valve 105 is kept leftward by governor pressure through passage 220, when the manual shift lever select the position "1" from other positions, passage 201 communicates through passage 211, the 2nd speed lock valve 116 and passage 212 to engage side chamber 123 of the hydraulic servo 122 to engage the friction brake 6. Thus 2nd speed ratio is attained. In the position "1," passages 203 and 206 are exhausted so that 3rd speed ratio cannot be attained because the friction clutch 4 is not engaged. When the 1-2 shift valve 105 is urged to rightward, 1st speed ratio is attained as before, and line pressure through passage 215 urges the valve spool 326 rightward from the left end surface, so that 1st speed ratio is maintained. In this case, as the friction brake 7 is engaged, the planet carrier 27 of the rear planetary gear unit 9 is clamped to prevent rotation in both directions compared to the one-way brake 10 in the case of the 1st speed ratio of the position D, so that an engine braking function can be obtained.

When the manual shift valve 104 is shifted to reverse drive position R, line pressure through passage 200 is supplied to passages 204, 205 and 206. Line pressure through passage 205 is applied to engage the friction brake 7 as before, and line pressure through passage 206 is communicated through the 2-3 shift valve 106 and passage 214 to the hydraulic servo 120 to engage the friction clutch 4, and thus as shown in Table 1 the output shaft 2 of the power transmission mechanism rotates in the reverse direction.

The governor valve assembly 112 and 113 is mounted to the output shaft 2 of the power transmission as shown in FIG. 1 and is adapted to supply hydraulic pressure representing the vehicle speed to passage 220. The governor valve may be of any construction representing the vehicle speed. In the illustrated embodiment, line pressure through passage 201 is introduced in the first governor valve 112 which is constructed as a pressure regulator valve to produce increasing hydraulic pressure as a function of increasing rotational speed of the output shaft 2. The pressure which is determined by equilibrium between centrifugal force, spring bias pressure and hydraulic pressure is supplied through passage 219 to the second governor valve 113 constructed as a change-over valve and adapted to supply fluid pressure beyond a predetermined speed of the output shaft 2 or the vehicle to the passage 220. The governor pressure through passage 220 is supplied to the 1-2 shift valve 105 and the 2-3 shift valve 106 to move the valve spools 326 and 330 respectively, as described before when the vehicle speed exceeds respective predetermined values, so that communication passages of the line pressure are changed to effect automatic shifting between 1st through 3rd speed ratios. Also, the passage 220 is communicated to the right end surface of spool 401 of the line pressure cutdown valve 114 to regulate hydraulic pressure actuating the friction elements as will be explained more detail hereinafter.

The kick-down valve 109 comprises a valve spool 346 which is biased to the rightward position by a spring 347 to block communication between passages 200 and 209. Engaging the right end surface of the spool 346, the kick-down solenoid 504 is provided. As the accelerator pedal 500 is depressed, the kick-down switch 503 is closed to energize the solenoid 504 thus actuating rod 348 to urge the valve spool 346 leftward, so that line pressure through passage 200 communicates to passage 209. Fluid pressure through passage 209 communicates to a groove between area difference lands 328 and 329 to urge the spool 326 rightward when the spool 326 is shifted leftward. Also, the passage 209 communicates the left end surface of the spool 330 of the 2-3 shift valve 106 to urge the spool 330 rightward. Consequently, the valve spool 330 or 326 will move rightward when the urging force overcomes the biasing force of the governor pressure through passage 220, so that a down-shift from 3rd to 2nd or from 2nd to 1st speed ratio will be obtained.

To detect the engine torque, throttle opening or vacuum pressure in intake manifold of the engine may be available. In the illustrated embodiment, the engine torque is detected by vacuum pressure in the engine intake manifold. In general gasoline engine, the engine torque is higher as vacuum pressure in the intake manifold is lower. To detect the engine torque the vacuum pressure diaphragm unit 502 is provided to engage right end surface of the throttle valve 107, and when pressure in vacuum chamber 505 of the vacuum diaphragm unit 502 is equal to atmospheric pressure in chamber 506, throttle valve spool 340 is urged to leftward, and also, as the vacuum is increased in the chamber 505 the biasing pressure to the spool 340 is decreased. The throttle valve 107 regulates the line pressure through passage 200 by leaking a portion thereof to an exhaust port to produce a hydraulic pressure representing the urging force of the vacuum diaphragm unit 502 and thus, representing the engine torque in passage 207. The throttle pressure through passage 207 is supplied to the left end surfaces of the line pressure booster valve 103 and the throttle modulator valve 108 which is combined with the 2–3 shift valve 106 and to the right end surface of the coasting booster valve 115 so that the valve spools are biased to regulate the shift point or to regulate line pressure through passage 200.

The line pressure regulator valve assembly 102 and 103 consists of the line pressure regulator valve 102 comprising a spool 310 and a biasing spring 311 and the pressure booster valve 103 comprising a spool 313 which is assembled in line with the spool 310. Fluid pressure produced by the oil pump 101 is introduced through passage 200 between lands 314 and 315 of the spool 310 and urges the spool 310 leftward by the area difference between the lands 314 and 315 against the biasing spring 311. When the fluid pressure through passage 200 is higher beyond a predetermined value, the spool 310 is urged leftward to open communication between passages 200 and 216 and supply torque converter working fluid as previously mentioned. When the fluid pressure is further increased, the spool 310 moves further leftward and land 317 thereof opens to an exhaust port to leak a portion of fluid and to reduce the hydraulic pressure in the passage 200. Thus, an equilibrium is produced between the urging hydraulic force and the biasing spring force, consequently, the fluid pressure in passage 200 is regulated to desired line pressure.

The line pressure booster valve 103 biases the spool 310 of the regulator valve 102 by the spool 313 when fluid pressure is applied to the left end surface of land 319 through passage 207, or between area difference lands 318 and 319 through passage 223, so that line pressure increases to attain equilibrium between the forces. On the contrary, when fluid pressure is applied to the right end surface of the spool 310 of the regulator valve 102 through passage 222 to urge the spool 310 leftward, the regulated line pressure through passage 200 is decreased correspondingly to attain equilibrium again.

The line pressure cut-down valve 114 comprises a valve spool 401 and a biasing spring 402. Governor pressure through passage 220 is applied to right end surface of land 403 of the spool 401 to urge the spool 401 leftward against the spring force, the throttle pressure through passage 207 is applied between area difference lands 403 and 404 to urge the spool 401 rightward. Thus, when the force produced by governor pressure is larger than the force produced by the spring 402 and throttle pressure, spool 401 is urged leftward to communicate passages 207 and 222, and when governor pressure is lower, spool 401 is urged rightward to communicate passages 222 and 221. Consequently, when the governor pressure is sufficiently high, throttle pressure through passage 207 is applied to both end surfaces of the line pressure regulator valve assembly 102 and 103 and as the land 314 is smaller than the land 319, line pressure increases as throttle pressure or engine torque increases.

The boost change-over valve 110 and the coasting booster valve 115, according to the invention, are provided in the above described hydraulic control system.

The boost change-over valve 110 comprises a valve spool 301 which is biased to the illustrated leftward position by a spring 302. Operation of the boost changeover valve 110 is as follows:

When the manual shift valve 104 is selected to position D, line pressure is communicated to passage 203 to apply fluid pressure between area difference lands 303 and 304, so that the spool 301 is urged rightward. Thus, passage 221 is blocked and passages 206 and 223 is communicated so that passage 223 is exhausted as passage 206 is exhausted.

When the manual shift valve is selected to position "2," the spool 301 is kept to illustrated position as passage 203 is exhausted. Passage 206 is blocked, and passages 221 and 223 are communicated.

When the manual shift valve is selected to position "1," operation of the valve 110 is similar to position "2" if the transmission mechanism is at 2nd speed ratio, however, at 1st speed ratio line pressure is communicated to passage 215 to apply fluid pressure to left end surface of land 305 to urge the spool 301 rightward. Thus passages 223 is communicated to passage 206 and exhausted as position D.

As described, in every forward drive position, except position "2" and 2nd speed ratio of position "1," when passage 221 is communicated to fluid pressure, passage 223 is communicated to fluid pressure and the pressure is applied between area difference land 318 and 319 of the pressure booster valve 103 resulting in increase of line pressure.

When the manual shift valve 104 is selected to position R, line pressure through passage 205 is communicated through passage 215 to the left end surface of land 305 to urge the spool 301 rightward, so that passages 206 and 223 are communicated, and as passage 206 is communicated to line pressure as shown in Table 2 the pressure is applied through passage 223 to the pressure booster valve 103 to increase line pressure.

Figure 3:
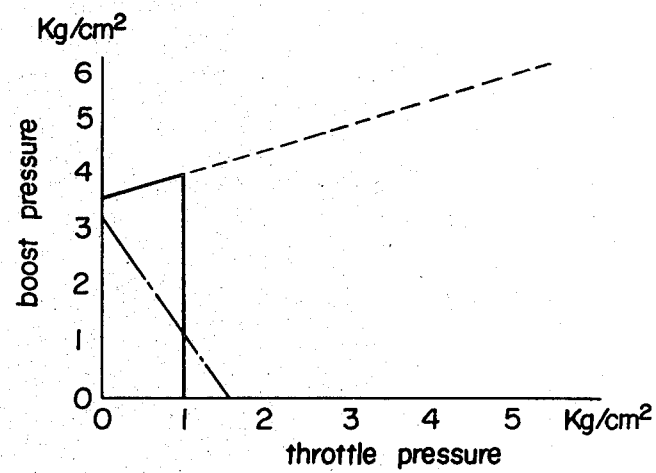

The coasting booster valve 115 comprises a valve spool 306 which is biased to the illustrated right end position by a spring 307. The throttle pressure passage 207 is communicated to the right end surface of the spool 306 so that when throttle pressure is below a predetermined value, the spool 306 is kept in the right end position to communicate line pressure passage 200 and passage 221, and when throttle pressure exceeds the predetermined value the spool 306 is urged leftward to block passage 200 and to exhaust passage 221. FIG. 3 shows fluid pressure through passage 221, and as shown by solid line, in the illustrated example, fluid pressure through passage 221 drops to zero at 1 kg./cm.$^2$ of the throttle pressure.

Figure 7:
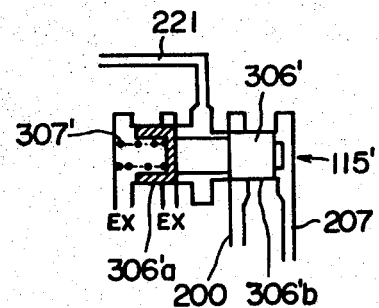
FIG. 7 shows another embodiment of the coasting booster valve shown in FIG. 2.

FIG. 7 shows another embodiment of the coasting booster valve which is constructed as a regulator valve. The valve 115' comprises a spool 306' providing area difference lands 306'a and 306'b which is biased rightward by a spring 307'. Thus, when throttle pressure through passage 207 is applied to right end surface of the spool 306', line pressure through passage 200 is modulated by leaking a portion of fluid to an exhaust port so that a modulated pressure is obtained in passage 221 as shown by the dash and dot line in FIG. 3. When throttle pressure is increased further, passage 200 is blocked and passage 221 is exhausted and a similar effect is obtained to the valve 115.

Fluid pressure through passage 221 is communicated to the line pressure cut-down valve 114, and as described before, when governor pressure through passage 220 is sufficiently low, passages 221 and 222 are communicated to apply fluid pressure through passage 222 to the right end surface of the pressure regulator valve 102 and the line pressure is decreased.

Figure 4:
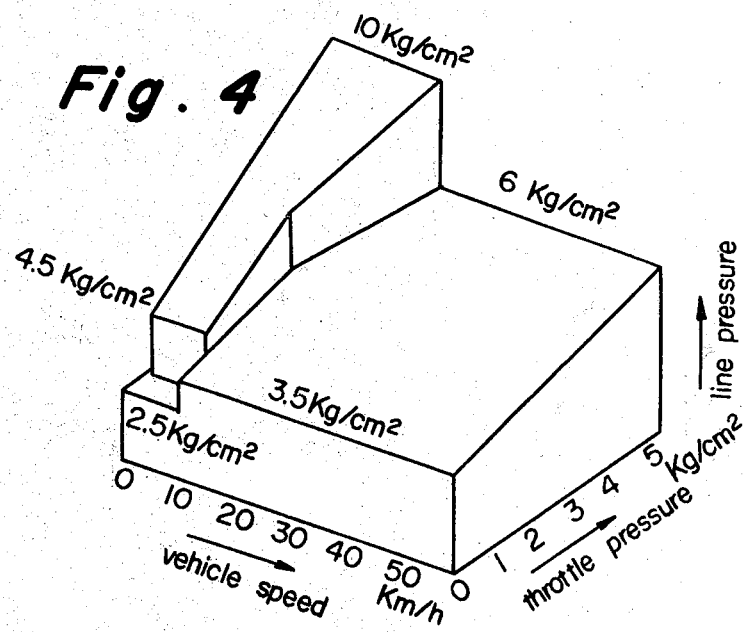

FIG. 4 shows the line pressure characteristic at position D and 1st speed ratio of position "1" in relation to vehicle speed and throttle pressure. When both throttle pressure and governor pressure are low line pressure is decreased as shown by the left portion of FIG. 4 to mitigate selector shift shock to start the vehicle. When throttle pressure is increased passage 221 is exhausted so that line pressure increases stepwise or steeply, according to construction of the valve 115 or 115'. When governor pressure increases, passage 221 is blocked and passage 222 communicates to throttle pressure passage 206, so that the same throttle pressure is applied to both surfaces of the pressure regulator valve assembly 102 and 103, so that line pressure decreases stepwise and increases gradually by the area difference between lands 314 and 319. When the operating condition is high throttle pressure and low governor pressure, fluid pressure through passage 222 is zero, so that only the left end of the pressure regulator valve assembly 102 and 103 is supplied with a fluid pressure, consequently the high pressure portion shown in the left side of FIG. 4 is provided to accommodate high torque capacity which is necessary to engage friction elements at low speed.

Figure 5:
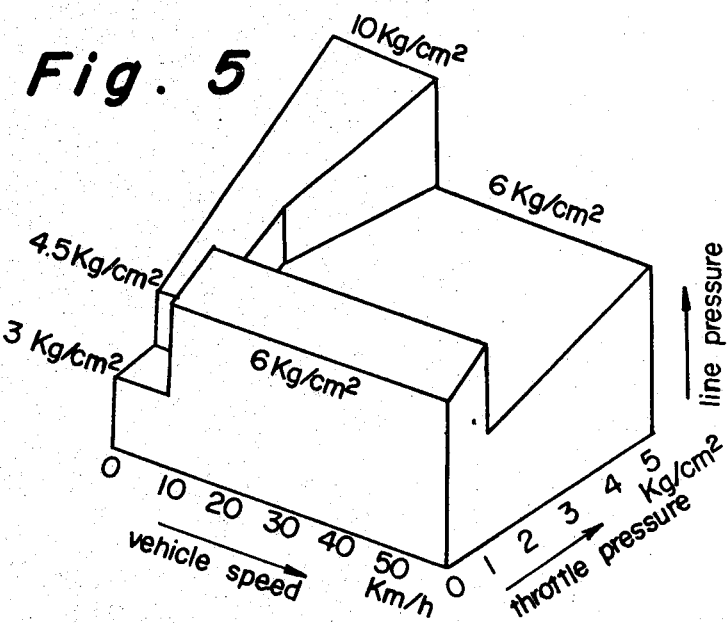
FIG. 5 is a characteristic diagram of hydraulic pressure at position "2" and 2nd speed of position "1,"

FIG. 5 shows the line pressure characteristic at position "2" in relation to vehicle speed and throttle pressure. As shown, when both throttle pressure and governor pressure are low, line pressure through passage 200 is applied through passages 221 and 222 to the right end surface of the pressure regulator valve 102 to decrease line pressure as shown by the lower left portion of FIG. 5 so that engagement shock to start vehicle is prevented or mitigated as before. Also at a high throttle condition, the line pressure is modulated as before.

When the position "2" is selected, passages 221 and 223 are communicated at boost change-over valve 110, and passage 221 is communicated to an exhaust port at the coasting booster valve 115 at high throttle pressure, however, passage 221 is communicated to line pressure at low throttle pressure, so that fluid pressure is applied through passage 223 between area difference lands 318 and 319 of the pressure booster valve 103 to urge the valve spool 313 rightward so that line pressure is increased stepwise as shown by the front portion of FIG. 5. Thus, when the selected position is shifted from position D to position "2" at a high speed low throttle operating condition to obtain an engine braking function, the line pressure is relatively high, so that friction elements engage promptly and excess slipping is prevented.

Figure 6:
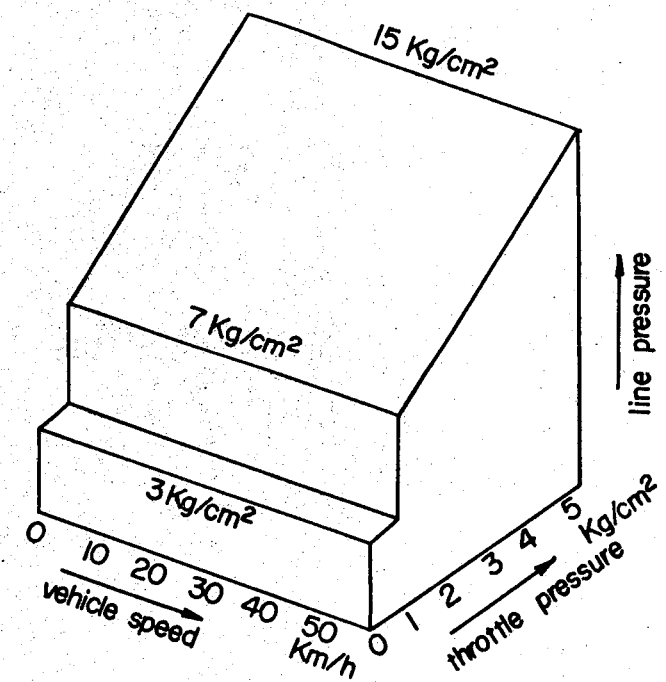
FIG. 6 is a characteristic diagram of hydraulic pressure at position R.

FIG. 6 shows line pressure characteristics at position R in relation to throttle pressure and vehicle speed. At reverse drive, friction elements must transmit greater torque compared to forward drive from the power transmission mechanism, so that line pressure must be increased to accommodate the higher engaging torque capacity. At position R, passages 206 and 223 are communicated at the boost change-over valve 110 and line pressure through passage 206 is applied through passage 223 between the area difference lands 318 and 319 of the pressure booster valve 103 to increase line pressure at relatively high throttle pressure compared to forward drive position D, "1" and "2", as shown in FIGS. 4 and 5. Also at position R, no governor pressure is applied as passage 201 is exhausted so that line pressure is not modulated by vehicle speed. At low throttle pressure, line pressure through passage 200 is communicated in the coasting booster valve 115 to passages 221 and 222 to apply fluid pressure to right end surface of the pressure regulator valve 102 so that line pressure is decreased stepwise as shown by the forward portion of FIG. 6, consequently selection shock to start vehicle is prevented. At higher throttle pressure, passages 221 and 222 are exhausted as before, so that modulating fluid pressure applied to the pressure regulator valve assembly 102 and 103 is line pressure through passage 223 and throttle pressure through passage 207 so that line pressure is increased and increases further as throttle pressure is increased.

It will be appreciated that by providing two simple valve means according to the present invention, line pressure is decreased at low speed low throttle operating condition to prevent selection shock when starting the vehicle, and also line pressure is increased at a high speed low throttle operating condition and 2nd speed of low range to provide sufficient torque capacity to engage friction elements promptly without excess slipping, when low speed range is selected to provide an engine braking effect.

What is claimed is:

1. A hydraulic control system for an automatic transmission for vehicles, said transmission mechanism having an input and an output shaft, at least one planetary gear unit disposed between said shafts, and a plurality of friction elements operatively connected to said planetary gear unit for obtaining a plurality of gear ratios by selectively engaging said friction elements by hydraulic pressure produced in said hydraulic control system, said hydraulic control system comprising, a fluid pump for producing a line pressure, line pressure passage means connected to said fluid pump for distributing said line pressure, a line pressure regulator valve connected to said line pressure passage means for regulating the line pressure therein, a manual shift valve communicating with said line pressure passage means and operable to select a plurality of positions including at least one high forward gear ratio position, throttle valve means communicating with said line pressure passage means, said throttle valve means producing throttle pressure representing engine torque, governor valve means communicating with said line pressure passage means, said governor valve means producing governor pressure representing vehicle speed, first valve means, second valve means, third valve means, throttle pressure passage means communicating said throttle valve means with said first valve means and said second valve means, governor pressure passage means communicating said governor valve means with said first valve means, a first passage communicating said first valve means with said line pressure regulator valve to decrease line pressure upon introduction of fluid pressure to said first passage, a second passage communicating with said first, second and third valve means, a third passage communicating said third valve means with said line pressure regulator valve to increase line pressure upon introduction of hydraulic pressure through said third passage, an exhaust port located in said second valve means for exhausting said second passage upon the application of throttle pressure to said second valve means beyond a predetermined amount, at least one port in said third valve means for the introduction of line pressure to shift said third valve, whereby, when said manual shift valve is placed in the high forward gear ratio gear position, line pressure is applied to said port of said third valve to shift said third valve and block communication between said second passage and said third passage to prevent an increase in line pressure and to allow regulated pressure to be communicating from said second passage to said third passage to increase the line pressure when said manual shift valve is in a position other than said high forward gear ratio position.

2. The hydraulic control system claimed in claim 1, wherein said third valve further comprises at least one additional port communicating with said line pressure when said manual shift valve is placed in a high gear ratio excluding position, whereby the line pressure applied to said additional port causes said third valve to block communication between said second and said third passages and communicate line pressure to said third passage to increase said line pressure.

References Cited

UNITED STATES PATENTS

| | | | |
|---|---|---|---|
| 3,310,991 | 3/1967 | Leonard | 74—869X |
| 3,362,261 | 1/1968 | Snyder et al. | 74—869X |
| 3,393,585 | 7/1968 | Pierce, Jr. | 74—869X |
| 3,446,098 | 5/1969 | Searles | 74—869 |

ARTHUR T. McKEON, Primary Examiner